Figure 1:
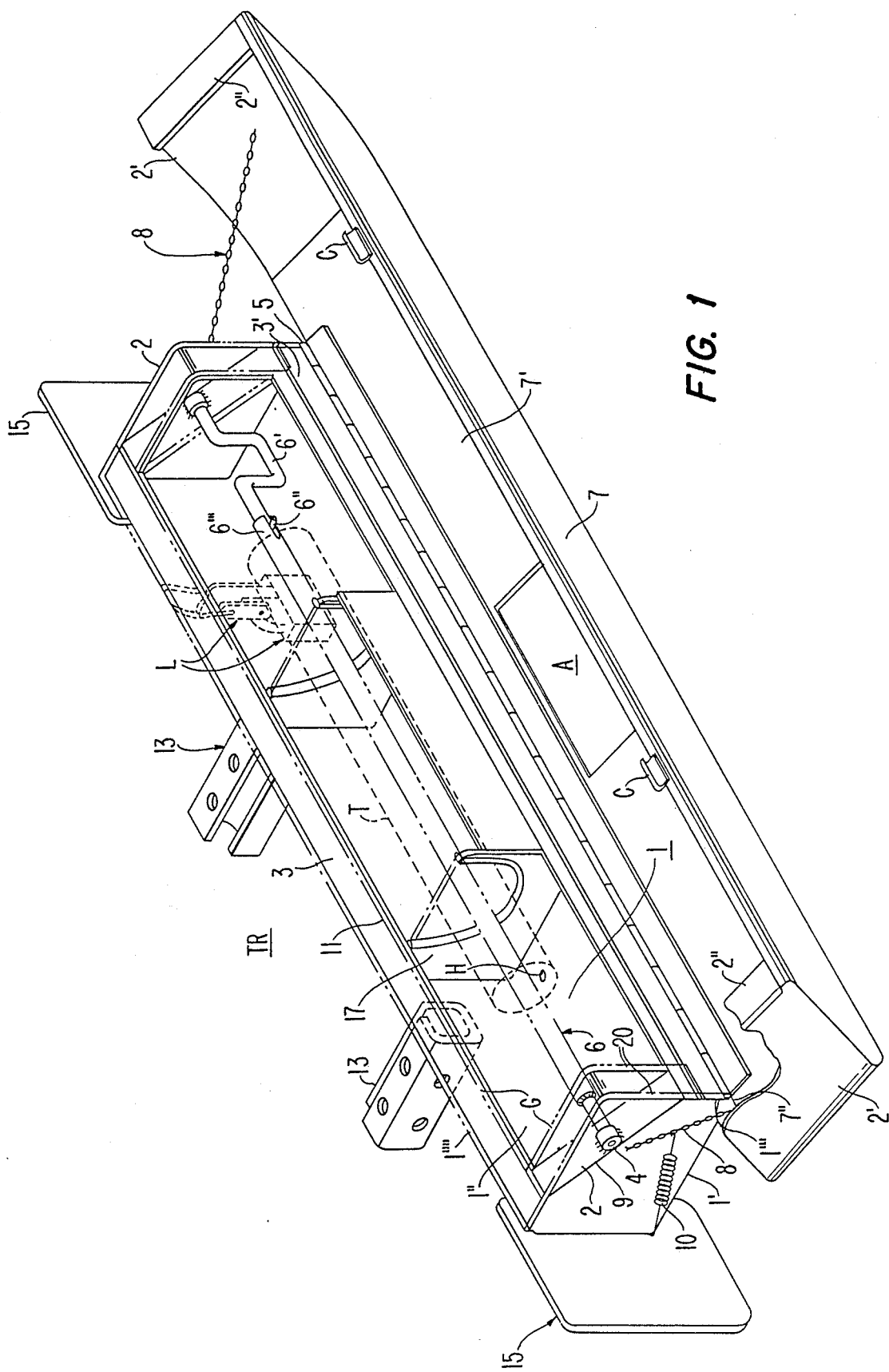

United States Patent [19]

Gancarz

[11] Patent Number: 4,901,895
[45] Date of Patent: Feb. 20, 1990

[54] TRUCK REAR BUMPER-STORAGE COMPARTMENT ASSEMBLY WITH FACILITY FOR SHEET MATERIAL STORAGE AND DISPENSING, SUCH AS TRUCK BED COVER TARPAULINS, TENTS AND THE LIKE

[76] Inventor: Norman M. Gancarz, Albee Rd., Dudley, Mass. 01570

[21] Appl. No.: 160,999

[22] Filed: Feb. 26, 1988

[51] Int. Cl.$^4$ .............. B60R 11/00; B60R 19/48; B60P 7/04
[52] U.S. Cl. .............. 224/42.03 A; 224/42.05; 293/117; 296/100
[58] Field of Search .............. 224/42.03 A, 42.03 R, 224/42.04, 42.05, 42.31; 293/106, 117, 118, 141; 296/37.1, 37.2, 37.3, 37.5, 37.6, 98, 100, 57 A; 220/324; 242/68.4, 86.5 R, 86.52; 280/500, 152 R, 769; 160/309, 323.1, 324, 325, 326

[56] References Cited

U.S. PATENT DOCUMENTS

| | | | |
|---|---|---|---|
| 1,719,055 | 7/1929 | Herzer | 293/106 X |
| 1,734,758 | 2/1929 | Banschbach | 224/42.05 |
| 2,700,572 | 1/1955 | Torrance | 296/37.2 |
| 2,701,728 | 2/1955 | Miller | 224/42.04 X |
| 2,723,156 | 11/1955 | Stanziale | 293/117 X |
| 2,898,147 | 8/1959 | Horner | 296/98 |
| 3,210,117 | 10/1965 | Hall | 296/37.2 |
| 3,471,070 | 3/1969 | Olson | 224/42.04 |
| 3,501,170 | 5/1970 | Da Valle | 280/500 |
| 3,606,385 | 2/1971 | Johannes | 280/422 |
| 3,614,136 | 11/1971 | Dent | 280/500 |
| 3,682,360 | 8/1972 | Fletcher et al. | 293/117 X |
| 3,774,949 | 11/1973 | Eger | 293/117 |
| 4,138,152 | 10/1979 | Prue | 293/117 |
| 4,570,986 | 3/1986 | Sams | 293/117 |
| 4,717,196 | 1/1988 | Adams | 296/98 |

FOREIGN PATENT DOCUMENTS 52535  1/1937  Denmark .............. 296/37.6

Primary Examiner—Harvey C. Hornsby
Assistant Examiner—Scott J. Haughland
Attorney, Agent, or Firm—Rines and Rines

[57] ABSTRACT

A novel vehicle bumper-storage compartment wherein the presence of the storage facility is totally hidden so as to provide the sole appearance of a bumper, but with added capability of storing and dispensing sheet material from within the storage compartment for such uses as covering a truck bed or providing adjacent emergency shelter or tenting and the like.

19 Claims, 3 Drawing Sheets

TRUCK REAR BUMPER-STORAGE COMPARTMENT ASSEMBLY WITH FACILITY FOR SHEET MATERIAL STORAGE AND DISPENSING, SUCH AS TRUCK BED COVER TARPAULINS, TENTS AND THE LIKE

The present invention relates to truck and other vehicle bumper assemblies containing internal storage compartments.

The art is replete with proposals for providing automobile rear bumper assemblies containing internal tool and storage boxes, as exemplified by U.S. Pat. Nos. 3,471,070; 3,606,385; 3,614,136; 4,138,152; and 4,570,986. Bumper assemblies for storing spare tires (U.S. Pat. No. 1,734,758) and hollow bumpers providing trailer hitch functions (U.S. Pat. No. 3,501,170) have also been proposed. While suitable for some storage applications, such assemblies do not well conceal or disguise the storage function, as distinguished from just appearing to be a bumper; their construction generally impairs the most efficacious bumper protection; their construction generally limits the useful volume of and ready accessibility to the storage compartment; and, additionally, they are not adapted for storing elongated functional sheet material such as cover or tent tarpaulin rolls, and the like, in a manner that enables dispensing withdrawal from the bumper storage compartment, as well as the carrying storage of the same.

The present invention, accordingly, is directed to a new and improved bumper-storage compartment that overcomes these and other disadvantages of prior proposals, and is particularly adapted for the storage and dispensing, withdrawal and roll-up of sheet material, as well as simultaneous storage of tools, supplies and other devices.

Other and further objects will be explained hereinafter and are more particularly delineated in the appended claims.

In summary, however, from one of its preferred viewpoints, the invention embraces a truck rear bumper-storage compartment/tarpaulin dispensing apparatus having, in combination, a rectangular metal housing provided with integral rear, bottom and end walls coextensive with the rear bumper area of a truck, and provided with means behind the rear wall for securing the same to the frame of the truck; the front and top walls of the housing being integrally connected and pivotable about a hinge connecting the lower edge of the front wall with the adjacent edge of the bottom wall to close the housing when pivoted upward and thus to serve as a bumper, and to open the housing when swung downwardly about the hinge to permit storage access within the housing compartment; means for mounting a tarpaulin roll upon an axle extending longitudinally within the housing compartment with the axle rotatable in bearing means carried by the end walls, and with the tarpaulin being withdrawable from the housing compartment about the axle when the front and top walls are swung downwardly, to serve such purposes as a cover for the bed of the truck or an external tent or shelter behind the truck; and, in the former case, to permit the front and top wall to be re-closed for bumper service while the withdrawn portion of the tarpaulin is serving as the truck bed cover. Best mode and other details of construction will now be presented.

Figure 2:
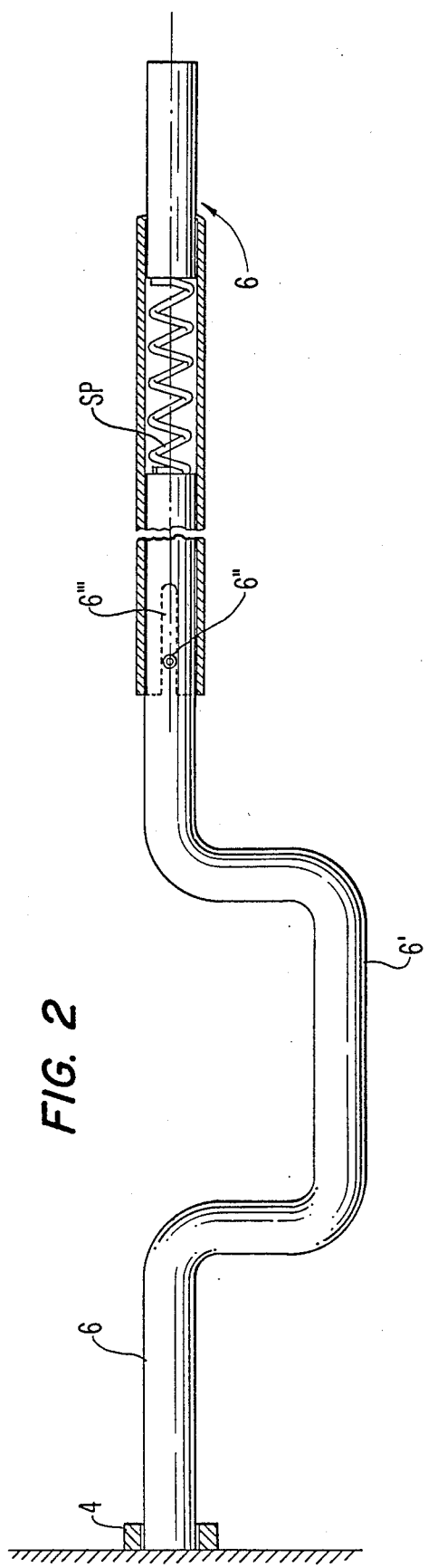
Figure 3:
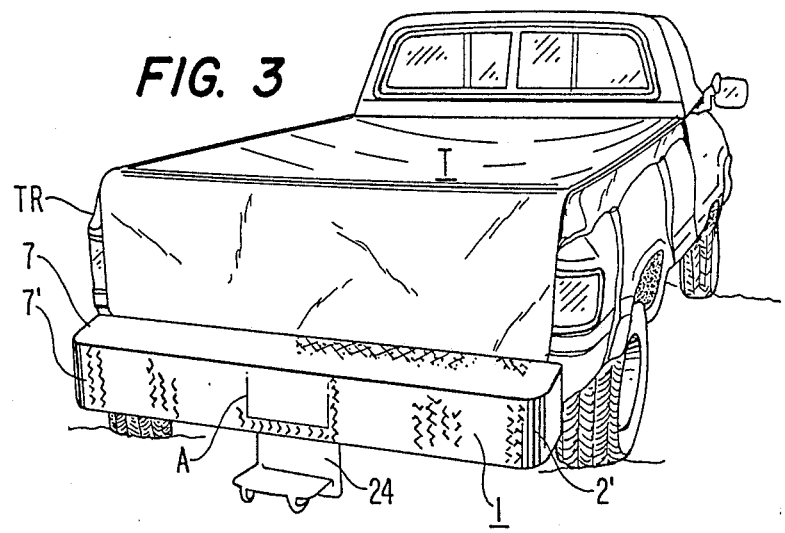
Figure 4:
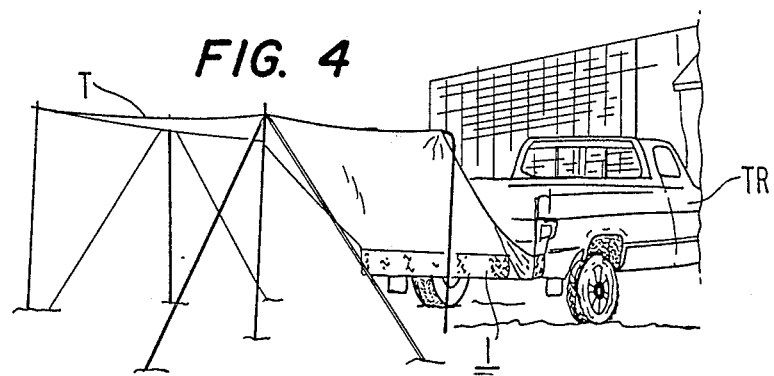
Figure 5:
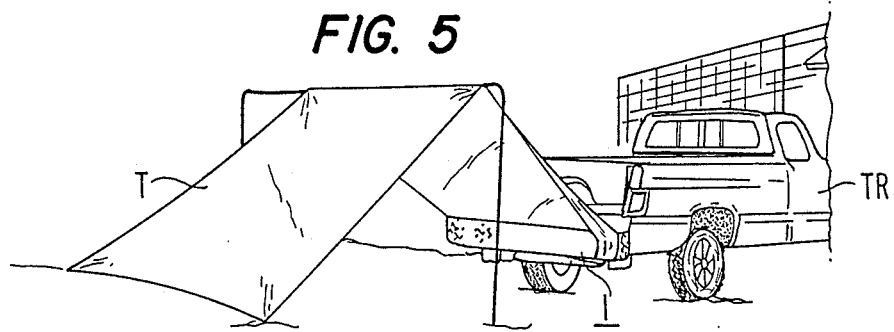

The invention will be described with reference to the accompanying drawings, FIG. 1 of which is an isometric view, shown in opened position, of a preferred embodiment of the invention;

FIG. 2 is a fragmentary longitudinal section, upon an enlarged scale, of the crank handle section of FIG. 1, looking from the back; and FIGS. 3, 4 and 5 are photographs of the tarpaulin-dispensing function of the invention.

Referring to FIG. 1, the bumper-storage compartment is shown in the form of a single rectangular box metal housing 1 having a base with a rear or back wall 1" integral with a bottom wall 1' and end walls or plates 2, and coextensive with preferably the total rear bumper area of the truck or other vehicle TR. An integral top wall 7 and front wall 7', formed with integral curved end walls 2' and dimensioned to cover the rear and back walls and to extend beyond the end walls 2 of the rear and back wall assembly, is hinged by the longitudinally extending hinge 5 connecting the lower edge 7" of the front wall 7' with the adjacent free edge 1''' of the bottom wall 1'. This permits pivoting upward from the open storage access position of FIG. 1, covering the inner assembly 1'-1"-2' to close the housing compartment and provide the bumper function, totally disguising and hiding the presence of the storage compartment. An aperture A in the front wall 7' exposes the license plate. Both for purposes of providing sub-compartments and for structural strength, inner compartment walls 17 may be provided, preferably tack-welded in place. The upper edge 1"" of the rear of back wall 1" is provided with a lip 3 extending substantially in the plane of the top opening of the compartment over which the top wall 7 closes, enabling a dirt-free and water-tight gasketed seal, if desired.

The inner L-shaped assembly of the rear wall 1" and bottom wall 1' may be fabricated, for example, from ⅛" heavy duty steel plate to the desired length such as, for example, 54 inches; being of all welded construction and triple bend design for additional strength. In this example, a storage compartment volume of approximately 5,000 cubic inches is provided extending the complete length of the bumper. The outer cover assembly of the front wall 7' and top wall 7 and curved end walls 2' may be cut from ⅛" heavy duty diamond patterned plate steel, as more particularly shown in FIG. 3, to a length dependent upon the model of the vehicle and/or the customer's desires. It also is preferably of 100% welded construction and triple bend design for supplemental strength and is shaped, as illustrated, totally to disguise and hide the presence of an internal storage compartment and to be indistinguishable by its diamond pattern exterior from conventional bumper appearance. The hinge 5, moreover, may be of heavy duty 1 ¾" stainless steel resistance-welded or riveted to a front lip 3' extending vertically from the free edge 1''' of the bottom wall 1' and to the inner lower edge region of the front wall 7'. Drainage holes H may be provided in all compartments in case water enters the compartment.

As shown in FIG. 1, the end walls 2 each comprise a diagonal lip 9 bent transversely to connect the edge of the top lip 3 with the edge of the bottom lip 3'. For waterproof operation, square end plates 20 (shown in dash-line) rather than such transverse cut end plates 2 may be employed so that when the outer assembly 7-7'-2' is swung upwardly to close the compartment, a gasket, shown at G, will seal all the way around.

The bumper-storage compartment assembly is illustrated as mounted on the frame of the truck TR by a pair of tubular structures 13 extending rearwardly from the rear wall 1" and slid on the existing frame, securing by welding or bolting. Mud flaps 15 are preferably riveted or screwed to the rear side edges of the back wall 1" to minimize the entry of dust and dirt. Rear lips 2" at the sides 2' of the outer assembly 7-7' provide a resting surface for the mudflaps, aiding in dirt suppression and also in strengthening and stiffening the outer assembly construction.

Weld-on latching and locking fixtures L, cooperative with catches C on the rear edge of the top wall 7, are shown in dotted lines provided at the upper edge region of the rear surface of the back wall 1".

As before intimated, a most desirable option afforded by the construction of the present invention is the facility to store and dispense sheet material such as canvas tarpaulins or the like, shown dotted at T in FIG. 1, and to dispense the same from the bumper compartment. Towards this end, an axle 6 extending longitudinally along the compartment 1 carries the tarpaulin roll, retractable by a crank section 6' within end wall bearings 4 and providing spring-loaded removable end mounting as more particularly shown in FIG. 2 (looking from the back instead of the front as in FIG. 1). The crank handle section 6' may be of ¾" structural round fitted into the axle tubing 6 with a small compression spring SP keeping the same in place, and with a pin 6" locking within a slot 6"' to enable the handle to turn the tubing axle 6. U-shaped openings in the sub-compartment walls 17 accommodate the roll T. Pushing the handle 6' longitudinally (axially) compresses the spring SP and enables the release from one end or the other.

Withdrawing the tarpaulin T or other sheet material through the open compartment will enable covering the truck bed, FIG. 3, with the cover assembly 7-7'-2' being re-closed to provide bumper service while the bed remains covered. Alternatively, the tarpaulin may be withdrawn to serve as an external cover, emergency shelter, lean-to, or tent behind the truck TR (or separate therefrom), FIGS. 4 and 5, respectively.

A safety chain 8 is provided at each end of the assembly 1, connecting the inner surface of the outer assembly end walls 2' with the outer surface of the inner assembly end walls 2 (or 20). This serves to support the opened hinged outer cover assembly 7-7'-2'. Springs 10 are also preferably provided, connected externally of the end walls 2 between the safety chains 8 and the lower corner region (say a drain hole) of the end walls 2 to provide resilient control of the tarpaulin withdrawal and take the slack out of the chain so that the cover will not flip open.

This protective bumper is thus designed for use as an easily accessible, yet inconspicuous storage compartment, with the facility for tarpaulin or other sheet material storage and dispensing, with other storage functions being also particularly useful. Some other suggestions as to practical storage use are: camping and trailer accessories, tow chains, small or medium size tools and tool boxes, and maintenance needs, such as oil, tire irons and jacks. For two-wheel drive vehicles, the storage compartments provide room for weight for better traction in winter. In addition, the storage compartment is useful for company trucks, for example, welding equipment, including full welding rod boxes, cable, helmets, rope and other applicable tools.

Hydraulic spring type mounts may be substituted, if desired, to allow the bumper to be attached to the front of a vehicle, as well, as for use by two trucks as a push-bumper, or as a special order.

The before-mentioned use of minimum materials and rough sizes and parts stock using nominal dimensions cuts down waste stock supply, with the construction of the invention requiring no complicated layout and consisting of mostly 90-degree bends and simple radii (of the order of 3", for example).

If desired, as before mentioned, a trailer hitch may be secured below the housing bottom wall as shown at 24, FIG. 3, and other modifications will also occur to those skilled in this art —such being considered to fall within the spirit and scope of the invention as defined in the appended claims.

What is claimed is:

1. Truck rear-bumper storage-compartment tarpaulin-dispensing apparatus, comprising:
 a rectangular metal housing defining a storage compartment and having a base with integral rear, bottom and end walls coextensive with the rear bumper area of a truck, a cover with integral front and top walls, means behind the base rear wall for securing the housing to a frame of the truck, and a hinge pivotally connecting a lower edge of the cover front wall with an adjacent edge of the base bottom wall such that the cover is pivotable upwardly about the hinge to close the storage compartment and thus to serve as a bumper and pivotable downwardly about the hinge to open the storage compartment and permit storage access within the storage compartment; bearing means carried by the base end walls of the housing; an axle extending longitudinally within the storage compartment and rotatable in the bearing means; and means for enabling mounting a a tarpaulin roll upon the axle, with the tarpaulin being withdrawable from the storage compartment about the axle when the housing cover been pivoted downwardly, to serve such purposes as a cover has for a bed of the truck or an external tent or shelter behind the truck, and, in the former case, to permit the cover to be re-closed for bumper service while the withdrawn portion of the tarpaulin is serving as the truck bed cover.

2. Apparatus as claimed in claim 1 and in which the cover front and top walls are integrally provided with end walls, and the cover top, front and end walls are dimensioned to cover and hide the pressure of the rear, bottom and end walls of the base.

3. Apparatus as claimed in claim 2 and in which an upper edge of the base rear wall is provided with a limp extending substantially in the plane of a top opening of the storage compartment to permit sealing of the cover along the top wall.

4. Apparatus as claimed in claim 3 and in which a free edge of the cover top wall is provided with means for enabling latching and locking of the cover top wall at an upper edge region of the base rear wall.

5. Apparatus as claimed in claim 2 and in which a free edge of the base bottom wall is provided with a lip extending vertically upward to which the hinge is attached.

6. Apparatus as claimed in claim 2 and in which the storage compartment is provided with an intermediate sub-compartment having side walls provided with substantially U-shaped openings to receive the tarpaulin roll.

7. Apparatus as claimed in claim 2 and in which the axle is provided on at least one side of the tarpaulin roll with a crank section for permitting rolling and unrolling.

8. Apparatus as claimed in claim 7 and in which said crank section is removably spring-held with a pin-slot catch to the axle to enable its rotation, the tarpaulin roll being removable from the axle by removing the crank section from the axle.

9. Apparatus as claimed in claim 2 and in which safety chain means is provided between the cover end walls and the base end walls, and spring means is connected externally of the base end walls between the safety chain means and portions of the base end walls to provide control of the tarpaulin withdrawal.

10. Apparatus as claimed in claim 2 and in which trailer hitch means is secured below the base bottom wall.

11. Truck rear-bumper storage-compartment apparatus, comprising:

a rectangular metal housing defining a storage compartment and having a base with integral rear, bottom and end walls coextensive with the rear bumper area of a truck, a cover with integral front and top walls, means behind the base rear wall for securing the housing to a frame of the truck, and a hinge pivotally connecting a lower edge of the cover front wall with an adjacent edge of the base bottom wall such that the cover is pivotable upwardly about the hinge to close the storage compartment and thus to serve as a bumper and pivotable downwardly about the hinge to open the storage compartment and permit storage access within the storage compartment, the cover front and top walls being provided with integral end walls, with the cover front, top and end walls being dimensioned to cover and hide the presence of the rear, bottom and end walls of the base.

12. Apparatus as claimed in claim 11 and in which an outer surface of the cover front and top walls and their end walls is patterned to appear as a bumper.

13. Apparatus as claimed in claim 11 and in which the base end walls are diagonal walls.

14. Apparatus as claimed in claim 11 and in which an upper edge of the base rear wall is provided with a lip extending substantially in the plane of a top opening of the storage compartment to permit sealing of the cover along the top wall.

15. Apparatus as claimed in claim 14 and in which a free edge of the cover top wall is provided with means for enabling latching of the cover top wall at an upper edge region of the base rear wall.

16. Apparatus as claimed in claim 11 and in which a free edge of the base bottom wall is provided with a lip extending vertically upward to which the hinge is attached.

17. Vehicle-bumper storage-compartment apparatus, comprising:

a rectangular housing defining a storage compartment and having a base with integral rear, bottom and end walls coextensive with the rear bumper area of a vehicle, a cover with integral front and top walls, means behind the base rear wall for securing the housing to a frame of the vehicle, and a hinge pivotally connecting a lower edge of the cover front wall with an adjacent edge of the base bottom wall such that the cover is pivotable upwardly about the hinge to close the storage compartment and thus to serve as a bumper and pivotable downwardly about the hinge to open the storage compartment and permit storage access within the storage compartment, the cover front and top walls being integrally provided with end walls, with the cover front, top and end walls being dimensioned to cover and hide the presence of the rear, bottom and end walls of the base.

18. Apparatus as claimed in claim 17 and in which an outer surface of the cover front and top walls and their end walls is patterned to appear as a bumper.

19. Truck rear-bumper storage-compartment apparatus, comprising:

a rectangular metal housing defining a storage compartment and having a base with integral rear, bottom and end walls coextensive with the rear bumper area of a truck, a cover with integral front and top walls, means behind the base rear wall for securing the housing to a frame of the truck, and a hinge pivotally connecting a lower edge of the cover front wall with an adjacent edge of the base bottom wall such that the cover is pivotable upwardly about the hinge to close the storage compartment and thus to serve as a bumper and pivotable downwardly about the hinge to open the storage compartment and permit storage access within the storage compartment; safety chain means provided between ends of the cover and the base end walls; and spring means connected externally of the base end walls between the safety chain means and portions of the base end walls.

* * * * *